(12) United States Patent
Auer et al.

(10) Patent No.: US 9,211,526 B2
(45) Date of Patent: Dec. 15, 2015

(54) SUPPORTED CATALYST OF DIGESTION RESIDUES OF TITANYL SULPHATE-CONTAINING BLACK SOLUTION

(75) Inventors: Gerhard Auer, Krefeld (DE); Frank Hipler, Krefeld (DE)

(73) Assignee: SACHTLEBEN PIGMENT GMBH, Krefeld (DE)

( * ) Notice: Subject to any disclaimer, the term of this patent is extended or adjusted under 35 U.S.C. 154(b) by 131 days.

(21) Appl. No.: 13/880,746

(22) PCT Filed: Aug. 26, 2011

(86) PCT No.: PCT/EP2011/064727
§ 371 (c)(1),
(2), (4) Date: May 15, 2013

(87) PCT Pub. No.: WO2012/052209
PCT Pub. Date: Apr. 26, 2012

(65) Prior Publication Data
US 2013/0244869 A1   Sep. 19, 2013

(30) Foreign Application Priority Data
Oct. 22, 2010   (EP) ..................................... 10188521

(51) Int. Cl.
*B01J 23/30* (2006.01)
*B01D 53/86* (2006.01)
(Continued)

(52) U.S. Cl.
CPC ............ *B01J 23/30* (2013.01); *B01D 53/8628* (2013.01); *B01D 53/9418* (2013.01);
(Continued)

(58) Field of Classification Search
CPC ........ B01J 23/30; B01J 23/22; B01J 37/0009; B01J 37/009; B01J 37/0201; B01J 21/063; B01J 35/1009; B01J 35/1014; C01G 41/02; C01G 31/02; B01D 53/8628; B01D 53/9418; B01D 2251/2067; B01D 2251/2062; B01D 2251/20707; B01D 2251/20776; B01D 2251/20723; B01D 2251/9207; C01P 2006/12; C01P 2002/50
USPC .......................................... 502/308, 350, 353
See application file for complete search history.

(56) References Cited

U.S. PATENT DOCUMENTS 4,038,364 A * 7/1977 Lailach ........................... 423/86
4,316,821 A * 2/1982 Bruckman .................... 502/350
(Continued)

FOREIGN PATENT DOCUMENTS

| DE | 19725018 A1 | 12/1998 |
| DE | 103 36 650 A1 | 2/2005 |

(Continued)

OTHER PUBLICATIONS

International application No. PCT/EP2011/064727, English translation of International Preliminary Report on Patentability, dated Apr. 22, 2013.
English abstract of DE 10 2007 055751.
English Abstract of DE19725018(A1), Dec. 24, 1998.

Primary Examiner — Anthony J Zimmer
(74) Attorney, Agent, or Firm — Cahn & Samuels, LLP

(57) ABSTRACT

A composition includes titanium dioxide-containing digestion residue from titanium dioxide production, and at least one further component which is catalytically active. Dimensionally stable, catalytically active solids which are obtained from this composition can be used as catalyst, for example for minimizing nitrogen oxides.

20 Claims, 3 Drawing Sheets

(51) Int. Cl.
  *B01D 53/94* (2006.01)
  *B01J 21/06* (2006.01)
  *B01J 23/22* (2006.01)
  *B01J 35/10* (2006.01)
  *B01J 37/00* (2006.01)
  *B01J 37/02* (2006.01)
  *C01G 31/02* (2006.01)
  *C01G 41/02* (2006.01)

(52) U.S. Cl.
  CPC .............. *B01J 21/063* (2013.01); *B01J 23/22* (2013.01); *B01J 35/1009* (2013.01); *B01J 35/1014* (2013.01); *B01J 37/009* (2013.01); *B01J 37/0009* (2013.01); *B01J 37/0201* (2013.01); *C01G 31/02* (2013.01); *C01G 41/02* (2013.01); *B01D 2251/2062* (2013.01); *B01D 2251/2067* (2013.01); *B01D 2255/20707* (2013.01); *B01D 2255/20723* (2013.01); *B01D 2255/20776* (2013.01); *B01D 2255/9207* (2013.01); *C01P 2002/50* (2013.01); *C01P 2006/12* (2013.01)

(56) References Cited

U.S. PATENT DOCUMENTS

| 5,387,726 | A | * | 2/1995 | Bankmann et al. | 568/814 |
| 5,391,471 | A | * | 2/1995 | Ohshima et al. | 430/523 |
| 5,484,757 | A | * | 1/1996 | Szymanski et al. | 502/439 |
| 5,723,404 | A | | 3/1998 | Buetje et al. | |
| 8,287,837 | B2 | | 10/2012 | Amirzadeh-asl | |
| 2003/0155302 | A1 | * | 8/2003 | Meng et al. | 210/665 |
| 2003/0231997 | A1 | | 12/2003 | Kettenbauer | |
| 2006/0091078 | A1 | * | 5/2006 | Meng et al. | 210/660 |
| 2006/0091079 | A1 | * | 5/2006 | Meng et al. | 210/688 |
| 2006/0236894 | A1 | | 10/2006 | Amirzadeh-asl | |
| 2007/0261604 | A1 | * | 11/2007 | Rosenhahn | 106/456 |
| 2009/0270243 | A1 | * | 10/2009 | Amirzadeh-Asl | 501/96.1 |
| 2010/0031772 | A1 | * | 2/2010 | Amirzadeh-Asl | 75/312 |
| 2014/0155256 | A1 | | 6/2014 | Becker et al. | |

FOREIGN PATENT DOCUMENTS

| DE | 10 2007 055751 A1 | 6/2008 |
| WO | 2006044768 A1 | 4/2006 |
| WO | 2008/015259 A1 | 2/2008 |

* cited by examiner

SUPPORTED CATALYST OF DIGESTION RESIDUES OF TITANYL SULPHATE-CONTAINING BLACK SOLUTION

This U.S. patent application is a national stage application of PCT/EP2011/064727 filed on 26 Aug. 2011 and claims priority of European patent document 10188521.8 filed on 22 Oct. 2010, the entireties of which are incorporated herein by reference

TECHNICAL FIELD

The invention concerns a composition comprising $TiO_2$-bearing digestion residue from titanium dioxide production and at least one further component which is catalytically active and dimensionally stable, catalytically active solid bodies which can be obtained from that composition and used as a catalyst for example for reducing nitrogen oxides.

BACKGROUND OF INVENTION

Supported catalysts are of great economic significance and in quantitative terms represent the largest group of heterogeneous catalysts. They are used for example for processing fossil raw materials, in the further processing of intermediate products and in the synthesis of chemical products. In addition supported catalysts have gained significantly in economic significance in the field of exhaust gas cleaning for emission control.

In that respect titanium dioxide and titanium-bearing catalysts are a significant proportion. Commercially available catalyst carriers on a titanium dioxide basis are produced primarily by precipitation reactions of titanium-bearing salts, hydrolysis of titanium-bearing compounds or by flame pyrolysis of titanium-bearing precursors.

Supported catalysts play an important part in particular in the catalytic decomposition of nitrogen oxides. The occurrence of nitrogen oxides ($NO_x$) in combustion processes is problematical from environmental points of view and various methods of reducing nitrogen oxides in exhaust gases are known. Selective catalytic reduction (SCR) has acquired particular significance, wherein the nitrogen oxides are reduced by added nitrogen-bearing compounds, preferably ammonia or urea, in the presence of a catalyst. Selective catalytic reduction of nitrogen oxides by means of ammonia ($NH_3$—SCR) can be summarised as follows:

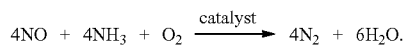

$$4NO + 4NH_3 + O_2 \xrightarrow{catalyst} 4N_2 + 6H_2O.$$

Sectors of use are in the static field for example power stations, coal-fired power stations, gas-fired power stations, refuse incineration installations, installations for nitric acid production or processing, steel works, and in the mobile field motor vehicles such as private cars and trucks as well as ships.

Commercial catalysts for SCR are in particular precious metals, metal oxides and zeolites. An overview is afforded by Pio Forzatti, *Present status and perspectives in de-NOx SCR catalysis*, in: Applied Catalysis A: General 222 (2001) 221-236. An important catalyst system is supported $WO_3$— and $V_2O_5$—$WO_3$-catalysts on a $TiO_2$ support, wherein the $TiO_2$ is usually predominately present in the anatase form (see for example U.S. Pat. No. 5,723,404 or WO 2006/044768).

SUMMARY OF THE INVENTION

With that background in mind the object of the present invention is to provide a catalyst support or catalyst which can be economically produced and which exhibits good activity, in particular in respect of nitrogen oxide reduction.

According to the invention that object is attained by the provision of a composition which contains (I) the titanium-bearing digestion residue from titanium dioxide production using the sulphate process and (II) at least one further component which is catalytically active and by the provision of a catalyst or catalyst raw material containing the composition.

Alternatively the object is attained by the provision of a dimensionally stable catalytically active solid body which can be obtained by mixing the above-defined composition with binding agents, plasticisers and optionally further additives, shaping of the resulting composition, preferably by extrusion, and then calcination, or by the provision of a dimensionally stable catalytically active solid body which can be obtained by applying the above-defined composition, optionally together with binding agents, plasticisers and further additives, to a support, and then calcination.

The invention also concerns the use of the digestion residue or the composition according to the invention and also of the dimensionally stable solid body according to the invention as a catalyst or for the production of a catalyst.

The invention further concerns a process for the production of the composition according to the invention, wherein the process includes the following steps:

(a) digestion of a titanium-bearing starting material with sulphuric acid to obtain a solid-bearing digestion solution;

(b) separation of the solids contained in the digestion solution to obtain a digestion residue and a substantially solid-free digestion solution, (c) optionally neutralisation and/or partial washing-out of the impurities, in particular the neutral salts, (d) mixing the digestion residue with at least one further component which is catalytically active, and (e) optionally calcining the resulting mixture.

rutile, magnesium titanium oxide, ilmenite and anatase.

Figure 1:
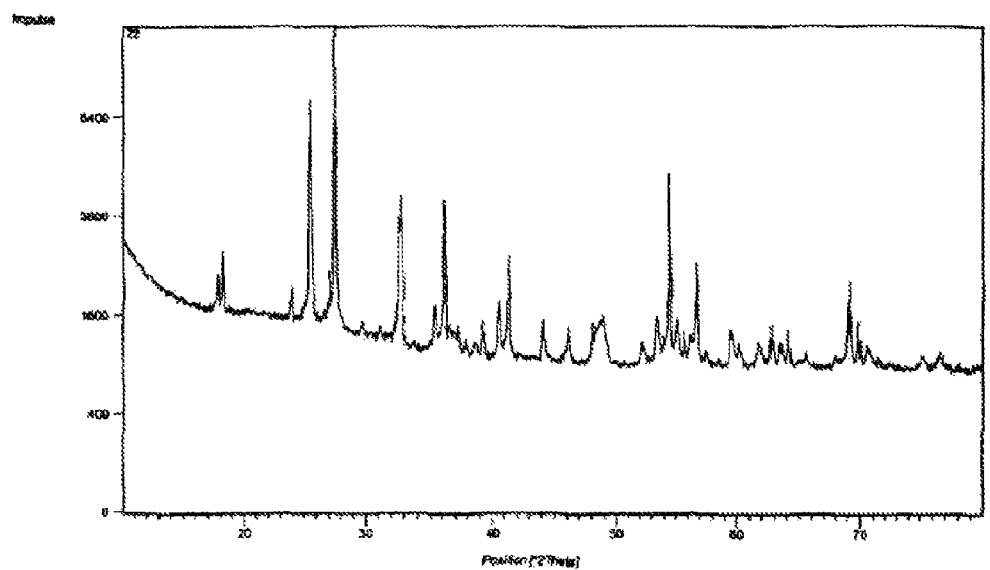
FIG. 1 shows an X-ray diffractogram of the washed and dried digestion residue. In that respect it is possible to detect inter alia the following compounds.
Figure 2:
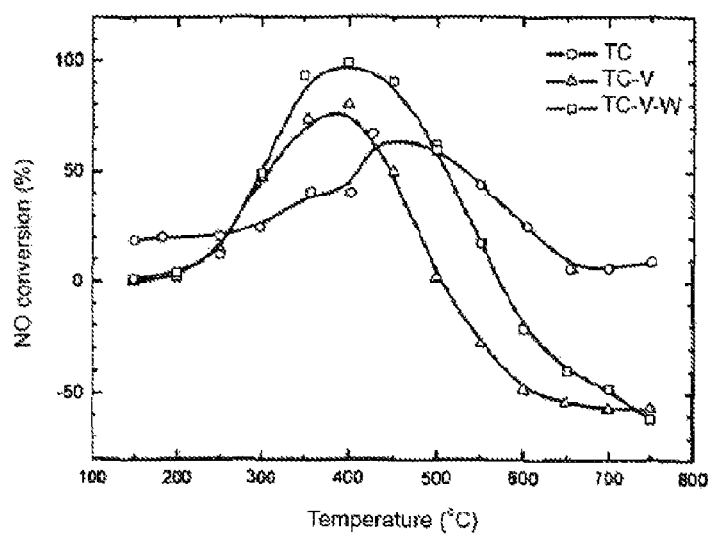

FIG. 2 shows the catalytic activity (NO-conversion) of a digestion residue according to the invention (TC), a composition according to the invention comprising digestion residue and 1.5% by weight of $V_2O_5$ (TC—V) and a composition according to the invention comprising digestion residue with 1.5% by weight of $V_2O_5$ and 10% by weight of $WO_3$ (TC—V—W) in the temperature range of 150° C. to 750° C.

Figure 3:
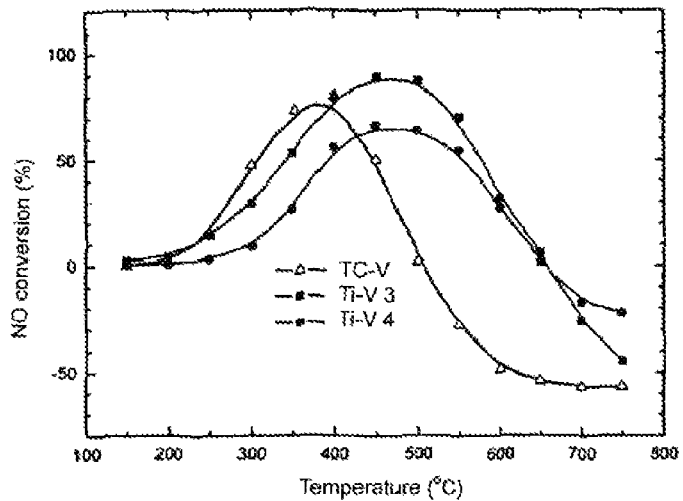

FIG. 3 shows the catalytic activity (NO-conversion) of a composition according to the invention comprising digestion residue and 1.5% by weight of $V_2O_5$ (TC—V) in comparison with conventional supported $V_2O_5$ catalysts on an anatase-$TiO_2$ support (Ti—V 3, starting from an anatase with a BET surface area of 90 m²/g; Ti—V 4 starting from an anatase with a BET surface area of 350 m²/g) in the temperature range of 150° C. to 750° C.

Figure 4:
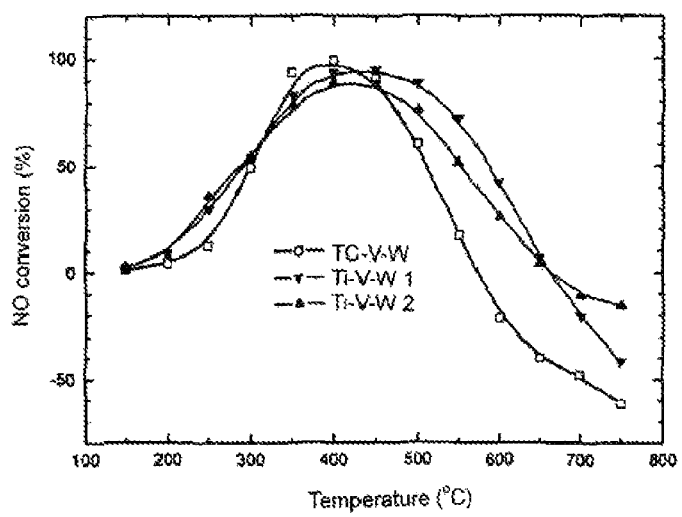

FIG. 4 shows the catalytic activity (NO conversion) of a composition according to the invention comprising digestion residue with 1.5% by weight of $V_2O_5$ and 10% by weight of $WO_3$ (TC—V—W) in comparison with conventional supported $V_2O_5$—$WO_3$-catalysts on an anatase-$TiO_2$ support (Ti—V—W 1 based on a laboratory material and Ti—V—W 2 based on commercially available material containing crenox A-DW-1) in the temperature range of 150° C. to 750° C.

Figure 5:
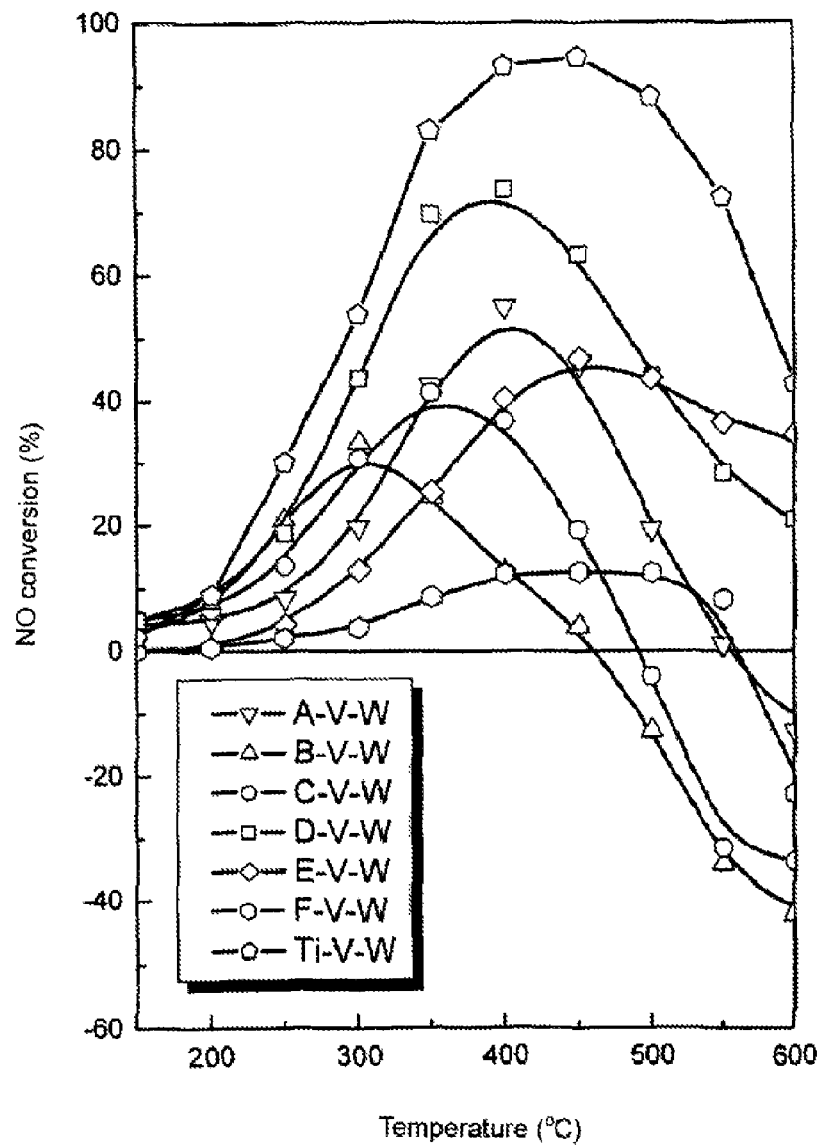

FIG. 5 shows the catalytic activities (NO-conversions) of compositions according to the invention comprising differently processed digestion residues, as described in Examples 2A to 2F, with 1.5% by weight of $V_2O_5$ and 10% by weight of $WO_3$ (A-V—W to F—V—W) in comparison with conventional supported $V_2O_5$—$WO_3$-catalyst on an anatase-$TiO_2$ support (Ti—V—W) in the temperature range of 150° C. to 750° C.

DETAILED DESCRIPTION OF THE INVENTION

The embodiments of the invention which are described hereinafter can be combined together in any way and in that fashion lead to particularly preferred embodiments.

The following detailed description discloses specific and/or preferred variants of the individual features according to the invention. It is to be appreciated that such embodiments which are produced by any combinations of two or more preferred embodiments are also in accordance with the invention and generally even preferred.

Unless otherwise stated the terms 'comprising' or 'comprises' are used in connection with the present application to specify that, besides the explicitly stated components, further components can optionally be present. It will be noted however that the terms are also to be so interpreted that they also embrace the embodiments which only consist of the stated components, that is to say which contain no other components than those listed.

Unless otherwise stated all proportions by percent are percentages in respect of weight. Details of percentages or other relative quantitative details of a component which is defined by a generic term are to be so interpreted that they relate to the total amount of all specific variants which fall within the generic term. If a generically defined component in an embodiment according to the invention is further specified for a specific variant falling within the generic term that is to be interpreted as meaning that in addition there are no other specific variants falling within the generic term so that the originally specified total amount of all specific variants now relates to the amount of the one given specific variant.

Component (I): The Digestion Residue

Component (I) of the composition according to the invention is the insoluble digestion residue which occurs in the production of titanium dioxide using the sulphate process upon digestion of the titanium-bearing starting material with sulphuric acid.

In titanium dioxide production using the sulphate process, after digestion of the titanium-bearing raw materials with sulphuric acid, the so-called titanyl sulphate-bearing black solution is produced, which still contains a certain proportion of undissolved digestion residues. Those solids components have to be separated out of the black solution prior to further processing. That is generally effected by means of vacuum filters or filter presses, generally after previous enrichment in thickeners (Ullmann's Encyclopaedia of Industrial Chemistry, 5th edition, Volume A20, pages 276-278).

The digestion residue is preferably used in the form of the filter cake obtained by separation, particularly preferably in the form of the dried filter cake. Drying can be effected with any method and assembly known to the man skilled in the art, for example in a drying cabinet, with a belt drier, spray drier or a spin flash drier. The dried digestion residue can possibly be deagglomerated or ground to a fine powder to improve further processability, for example by means of a pinned disc mill, a roller mill, a Bauermeister mill or other assemblies known to the man skilled in the art.

It may however also be advantageous for the digestion residue to be used in the form of an undried filter cake as, in the production of catalytically active preparations, in particular SCR-DENOX catalysts, the titanium-bearing materials are mixed, kneaded and further processed, by means of water, with further additives. It is possible in that way to avoid expensive drying of the digestion residue. In an embodiment of the invention therefore the digestion residue can be used in the form of a filter cake or a suspension with a solids content of less than 90% by weight, preferably less than 80% by weight.

Preferably the filter cake is also washed, optionally prior to a drying operation, with acid, particularly preferably with diluted sulphuric acid, and/or water, to displace the adhering titanyl sulphate-bearing solution. A base can then be added as a neutralisation agent until a pH value of 5 to 12 is set.

Washing out the sulphate from the digestion filter cake and subsequent neutralisation makes it possible to obtain a low-sulphate, neutralised, finely divided titanium concentrate. The washed digestion filter cake obtained in that way contains substantially less sulphates than the original filter cake. For further reduction in the sulphate content, it is also possible to implement renewed filtration after previous redispersion in water.

Neutralisation of the filter cake can be effected by the filter cake being redispersed with water, mixed with a base as a neutralisation agent and then filtered again and possibly washed once again. It is also possible for neutralisation of the filter cake to be effected without renewed mixing directly in or on the filter assembly, by the filter cake being washed with an aqueous solution of the neutralisation agent. It is also possible for solid or liquid alkalis to be added to the filter cake for the purposes of neutralisation or to be kneaded into the filter cake. All common alkaline compounds, for example solid or dissolved alkali metal or alkaline earth hydroxides are suitable as the neutralisation agent.

Alternatively the filter cake can be washed with water until it reacts neutral or approximately neutral so that the addition of a neutralisation agent can be entirely or partially eliminated.

However a certain sulphate content and a certain acidity can be advantageous—in particular for use as an SCR-DENOX catalyst—for example in respect of catalytic activity. In an embodiment according to the invention the digestion residue used, in relation to the solids content of the digestion residue, therefore preferably has a sulphate content of 1.0 to 6.0% by weight, preferably 3.0 to 5.0% by weight.

For other catalytic applications, a sulphate content of 3 to 15% by weight, in particular 4 to 12% by weight, may be advantageous.

The pH value of the digestion residue used is preferably 1 to and particularly preferably 1.5 to 3.

The digestion residue used, which contains substantially non-digested ore, preferably has a $TiO_2$ content of 10 to 90% by weight, particularly preferably 25 to 70% by weight and most preferably 40 to 60% by weight with respect to the solids proportion. The detailing of the $TiO_2$ content results from element-analytical investigations and involves both crystalline titanium oxide and also non-crystalline, amorphous proportions.

The $TiO_2$ is preferably partially present in the rutile modification, in particular the intensity of the rutile main reflex at 2theta=27.5% is at least 10% of the intensity of the most intensive of all other reflexes of an X-ray powder diagram, preferably at least 30%, particularly preferably at least 80%. The X-ray-crystalline phases can be determined qualitatively and quantitatively by X-ray diffractometry (see for example H Krischner and B Koppelhuber-Bitschnau, Röntgenstrukturanalyse and Rietveldmethode, 5th edition, Friedr. Vieweg & Sohn Verlagsgesellschaft mbH, Brunswick/Wiesbaden, 1994).

The digestion residue preferably contains both magnesium titanate (for example in the form of $MgTi_2O_5$ and/or $Mg_{0.75}Ti_{2.25}O_5$) and also iron titanate (ilmenite $FeTiO_3$) and calcium titanate (for example $CaTiO_3$).

The digestion residue further preferably contains iron oxides, preferably in an amount of 0.5 to 30% by weight, still more preferably 2 to 20% by weight, calculated as $Fe_2O_3$.

The digestion residue further preferably has an aluminium content (as $Al_2O_3$) of 0.5 to 20% by weight, preferably 2 to 10% by weight. In addition the digestion residue preferably has a silicon content (as $SiO_2$) of 5 to 40%, preferably 10 to 20% by weight.

The uncalcined digestion residue used for production of the composition according to the invention preferably has a BET surface area of 1 to 150 $m^2/g$, particularly preferably 3 to 50 $m^2/g$ and particularly preferably 5 to 30 $m^2/g$. In that respect the BET surface area is determined in accordance with DIN ISO 9277 by means of $N_2$ at 77 K on a sample which is degassed at 140° C. for 1 hour and dried. Evaluation is effected by way of multi-point determination (10-point determination).

A preferred acid digestion residue is for example the material described in Example 3 in DE 197 25 018 B4. That material is suitable for example for the production of DENOX catalysts.

A preferred neutral and low-salt (in particular low-sodium) digestion residue is for example the material described in Example 4 of DE 197 25 018 B4. That material is suitable for example for the production of catalysts in which Na compounds are unwanted.

For production of a catalyst from that digestion residue it is generally mixed with a further component (II) which is catalytically active, preferably with a tungsten compound and/or a vanadium compound, as set forth hereinafter.

Mixture of Digestion Residue and Additional Titanium Dioxide ($TiO_2$)

Prior to mixing with the catalytically active component (II) the digestion residue can be mixed with additional titanium dioxide which for example is conventionally used as a catalyst or catalyst support. The additional titanium dioxide however can also be used as the catalytically active component (II).

In an embodiment therefore the invention also provides a composition which contains the above-described digestion residue, additional titanium dioxide and optionally at least one further component, which is catalytically active.

That titanium dioxide which can be used in the form of a mixture with the digestion residue is preferably a titanium oxide hydrate. Preferably the additional titanium dioxide or titanium oxide hydrate is present in the anatase form. The additional titanium dioxide, preferably the above-described titanium oxide hydrate, can however also have a ratio determined by X-ray diffractometry of titanium dioxide in the anatase form to titanium dioxide in the rutile form of greater than 90:10, particularly preferably greater than 99:1. The X-ray-crystalline phases can be determined qualitatively and quantitatively by X-ray diffractometry (see for example H Krischner and B Koppelhuber-Bitschnau, Röntgenstrukturanalyse and Rietveldmethode, 5th edition, Friedr. Vieweg & Sohn Verlagsgesellschaft mbH, Brunswick/Wiesbaden, 1994).

Particles of that titanium oxide hydrate can be obtained for example by hydrolysis of a sulphuric acid-bearing titanyl sulphate solution. Depending on the respective origin and composition of the sulphuric acid-bearing titanyl sulphate solution, in the hydrolysis operation, a sulphuric acid suspension of titanium oxide hydrate is obtained, which can still contain unwanted impurities, for example heavy metals. Generally therefore one or more cleaning steps are implemented to free the titanium oxide hydrate of unwanted impurities.

Preferably titanium oxide hydrate particles are used, which are produced by hydrolysis of titanyl sulphate which occurs in the production process for titanium dioxide using the sulphate process. That process is described for example in Industrial Inorganic Pigments, 3rd edition, edited by Gunter Buxbaum, Wiley-VCH, 2005.

The sulphate content of the titanium oxide hydrate is preferably up to 2.5% by weight with respect to $TiO_2$. Thus the sulphate content can be 0.5 to 2.5, preferably 1.5 to 2.5% by weight, with respect to $TiO_2$, but also less than 0.5% by weight.

The titanium oxide hydrate preferably has a BET surface area of 40 to 300 $m^2/g$, particularly preferably 60 to 150 $m^2/g$. In that case the BET surface area is determined in accordance with DIN ISO 9277 by means of $N_2$ at 77 K on a sample of the titanium oxide hydrate particles, which is degassed at 140° C. for 1 hour and dried. Evaluation is effected by way of multi-point determination (10-point determination).

According to the invention it is preferred for the digestion residue to be mixed with the additional titanium dioxide, preferably with the above-described titanium oxide hydrate, in a weight ratio of greater than 50:50, particularly preferably greater than 70:30. In that respect higher contents of titanium oxide hydrate generally cause a higher level of catalytic activity, higher contents of digestion residue in that respect give rise to lower costs and better workability.

Component (II) and Catalytic Activation

For production of the composition according to the invention the digestion residue, alone or the mixture comprising the digestion residue and the above-described additional titanium dioxide, preferably the above-described titanium oxide hydrate, is mixed with a further component (II) which is catalytically active. In that respect the digestion residue alone or the mixture of the digestion residue and the above-described additional material preferably function as a support material. It is however also possible for the additional titanium dioxide to serve as the catalytically active component (II) while the digestion residue serves predominantly as support material.

The component (II) can be applied for example for the purposes of a doping operation, optionally surface doping or bulk doping, or as a coating, wherein application can advantageously be effected by impregnation, precipitation reactions, chemical solution deposition, depositions from the gaseous phase such as for example chemical vapour deposition (CVD) or atomic layer deposition (ALD).

The digestion residue or the mixture of digestion residue and the additional titanium dioxide can be adapted by means of a large number of different physical and chemical methods known to the man skilled in the art to the application requirements and can act both as a catalyst and also a catalyst support. For that purpose the man skilled in the art can for example also mix the digestion residue or the mixture of digestion residue and the additional titanium dioxide, preferably the above-described titanium oxide hydrate, with further components such as for example glass fibres or plasticising aids, extrude same or apply same to other support materials.

The component (II) can also be any component which has a catalytic action, for example in the processing of fossil raw materials, further processing of intermediate products and synthesis of chemical products or in the field of exhaust gas cleaning. By way of example mention is to be made here of the catalytic decomposition of nitrogen oxides ($NO_x$), catalytic oxidation of $SO_2$, soot oxidation, oxidation of hydrocarbons, oxidative dehydrogenation, and isomerisation, epoxidation and aldol reactions.

The component (II) can be for example a metal, a metal oxide or another metal compound. In particular the component (II) may contain at least one element selected from the group consisting of Pt, Pd, Rh, Ru, Au, Ag, Co, Cu, Ce, Ni, V, W, Mo, Sb, Bi, W, La, Y, Sc, Zr, Hf, Ta, Tb, Ce, Yb, Er and Sm.

Preferably the composition according to the invention contains at least 0.05% by weight, preferably at least 0.5% by weight, of an element selected from the group consisting of Pt, Pd, Rh, Ru, Au, Ag, Co, Cu, Ce, Ni, V, W, Mo, Sb, Bi, W, La, Y, Sc, Zr, Hf, Ta, Tb, Ce, Yb, Er and Sm.

After the digestion residue or the mixture of the digestion residue and additional titanium dioxide has been mixed with the component (II) the composition can be calcined at a temperature of preferably 300 to 900° C., particularly preferably 400 to 700° C., for preferably 0.1 to 20 hours, particularly preferably 0.5 to 3 hours.

In a preferred embodiment the composition contains tungsten compounds. In a further preferred embodiment the composition contains vanadium compounds. The composition however may preferably also contain tungsten and vanadium compounds. In relation to the solids content of the composition the composition particularly preferably contains at least 1.0% by weight of tungsten, calculated as $WO_3$, and/or at least 0.05% by weight of vanadium, calculated as $V_2O_5$.

Preferably for that purpose the support material which contains the digestion residue or the mixture of digestion residue and the additional titanium dioxide is impregnated with a tungsten-bearing, preferably tungstate-bearing, solution (for example ammonium tungstate $((NH_4)_{10}W_{12}O_{41}\cdot 5H_2O)$, for example a slurry of the support material is agitated in the ammonium tungstate solution over a given time. In that respect the procedure is such that after subsequent calcination the $WO_3$ content is 1.0 to 20% by weight, preferably 1.0 to 5.0% by weight, in relation to the total amount of support material and $WO_3$. Adjustment of the $WO_3$ content can be effected for example by concentration of the tungstate solution and can be controlled by atomic absorption spectroscopy.

After mixing with the tungsten-bearing solution the (coated) support material is optionally filtered off, dried, preferably by spray drying, and then calcined. For the calcination operation temperatures of over 150° C., preferably 350 to 600° C. and particularly preferably 450 to 550° C. are used.

The resulting tungsten-bearing support or catalyst material (for example the tungsten-bearing titanium concentrate) preferably has a BET surface area of 3 to 70 m$^2$/g, preferably 3 to 50 m$^2$/g, particularly preferably 5 to 30 m$^2$/g. The BET surface area is measured in accordance with the above-described method.

It is preferable for the $WO_3$ content and the BET surface area to be matched to each other in such a way that $WO_3$ is present in an amount of 0.05 to 0.20% by weight/m$^2$, with respect to the total weight of support material and $WO_3$.

The possibly tungsten-bearing support material can be selected with at least one (further) metal oxide from the group consisting of vanadium, molybdenum, iron, chromium, copper, niobium, nickel, cobalt, antimony, bismuth, lanthanum, yttrium, scandium, zirconium, magnesium, hafnium, tantalum, terbium, cerium, ytterbium, erbium, samarium, cerium, cobalt, barium and manganese, and/or with at least one metal selected from the group consisting of silver, gold, ruthenium, palladium, platinum and rhodium.

The composition according to the invention can also preferably include a vanadium compound, particularly preferably $V_2O_5$ and more specifically preferably in an amount of 0.05 to 3.0% by weight of $V_2O_5$, particularly preferably 1.0 to 3.0% by weight of $V_2O_5$, most preferably 1.2 to 2.0% by weight of $V_2O_5$, in relation to the total weight of support material, $V_2O_5$ and optionally $WO_3$.

In the case of use as a DeNOx catalyst, for example in $NH_3$—SCR catalysis, the man skilled in the art can easily control the activity in a given temperature range by targeted variation in the vanadium oxide content to be involved. The choice of the amounts to be involved is implemented by targeted quantitative variation in suitable test series. Thus it is known that high $V_2O_5$ concentrations (for example 3% of $V_2O_5$) cause high activity of the catalyst at relatively low temperatures (for example below 300° C.), but at higher temperatures entail a greater loss in activity and also an increased and at the same time unwanted ammonia oxidation effect. The suitability of the catalyst for a higher or enlarged temperature range is made possible by a reduction in the $V_2O_5$ concentration (for example 0.5 to 2% of $V_2O_5$).

The $V_2O_5$ can be supplied by the composition according to the invention containing the digestion residue, optionally additional titanium dioxide and optionally $WO_3$, being impregnated in a vanadium-bearing solution and then (once again) calcined. The vanadium-bearing solution is preferably a vanadate-bearing solution (for example with ammonium metavanadate), vanadium oxalate-bearing solution or vanadium sulphate-bearing solution. Prior to the calcination operation the vanadium-bearing powder is optionally filtered and dried, preferably spray dried. Preferred calcination temperatures are in the range of 300 to 700° C., wherein the particle size to be set, the BET, the pore size of the material like also the decomposition performance of the vanadium-bearing starting compound is crucial. In the case of ammonium metavanadate decomposition is usually already concluded at 300° C.

The composition according to the invention preferably has a titanium content of 6 to 54% by weight.

In addition the composition preferably has a pH value of 1 to 5, in particular 1.5 to 3.

In an embodiment the composition further has after calcination a BET surface area of 3 to 70 m$^2$/g, preferably 3 to 50 m$^2$/g, particularly preferably 5 to 30 m$^2$/g. As already mentioned above calcination is generally effected at a temperature of preferably 300 to 900° C., particularly preferably 400 to 700° C., for preferably 0.1 to 20 hours, particularly preferably 0.5 to 3 hours.

The sulphate content of the composition is preferably 0.1 to 10% by weight, particularly preferably 0.5 to 3.0% by weight, with respect to the solids component of the composition.

In an embodiment the composition is in the form of a filter cake or a suspension with a solids content of less than 90 by weight, preferably less than 80% by weight.

The ratio, determined by X-ray diffractometry, of titanium dioxide in rutile form to other crystalline phases in the composition is expressed by the intensity ratio of the rutile main reflex at 2theta=27.5° and the most intensive of all other reflexes of an X-ray powder diagram. In that respect the intensity of the rutile main reflex at 2theta=27.5° is at least 10% of the intensity of the most intensive of all other reflexes of an X-ray powder diagram, preferably at least 30%, particularly preferably at least 80%.

The Dimensionally Stable, Catalytically Active Solid Body

For production of the dimensionally stable solid body according to the invention from the composition according to the invention, (that is to say the catalytically activated support material) the composition is mixed with organic binding agents and optionally plasticisers and further additives like glass fibres, preferably in the presence of water, to produce a ceramic paste. In that case the composition is preferably used in an amount of 60 to 90% by weight, in particular 70 to 80% by weight, in relation to the resulting mixture.

Sheet silicates such as bentonite and kaolin can be used as binding agents and/or as thixotropic agents. Typical examples of those minerals with sheet-form structural units (phyllosilicates) are serpentine $Mg_3(OH)_4[Si_2O_5]$, kaolinite $Al_2(OH)_4[Si_2O_5]$ as well as montmorillonite as the main mineral of bentonite.

Further additives which can be used in the mixture include for example glass fibres for structure reinforcement (for example with a proportion of 5 to 15% by weight), acrylic polymers as binding agents, cellulose or cellulose derivatives as swelling/plasticising agents, ammonium hydroxide, organic acids such as for example lactic acid or oxalic acid as dissolution aids and/or complexing agents, and aminoalcohols such as for example aminomethyl propanol or monoethanol amine for pH adjustment.

In further processing of the resulting mixture comprising the composition according to the invention and the binding agents and possibly plasticisers and further additives a distinction can be essentially drawn between two variants, namely between the production of so-called full catalysts and the production of layer catalysts, for example so-called plate catalysts.

The term full catalyst is used to denote a dimensionally stable solid body which is produced completely or throughout from the above-described mixture of the powder composition according to the invention and the binding agents and optionally plasticisers and further additives. The term 'dimensionally stable' is used according to the invention to mean substantially 'non-powdery' and self-supporting. For that purpose that mixture is preferably kneaded and then put into a given shape, for example by extrusion or pressing. Particularly preferably the mixture is extruded to give a ceramic monolith which can be described as a honeycomb solid body. In that case the honeycombs can assume any geometrical shapes known to the man skilled in the art. The honeycombs are generally square in cross-section and not hexagonal, as the name leads us to assume. Dimensionally stable solid bodies with a support material content of at least 80% by weight with respect to the total mass are preferred.

After extrusion or pressing the solid body is dried and then calcined. The resulting honeycomb bodies preferably have a wall thickness of 0.5 to 2 mm and a passage width of 3 to 10 mm.

In the production of layer catalysts like plate catalysts the procedure involved is as follows: the resulting mixture comprising the preferably powdery composition according to the invention with optionally binding agents, plasticisers and/or further additives is applied to a support material and then dried and calcined. The support material can be a geometrical body, preferably shaping and possibly perforated plates, for example comprising paper or ceramic, or metal or metal meshes.

A full catalyst is preferred according to the invention.

Applications in Catalysis

The compositions and shaped bodies according to the invention are well suited as catalysts.

The digestion residue or the products according to the invention, that are derived therefrom, are highly suited for use in the method of exhaust gas denitrification (DeNOx) as a denitrification catalyst for an efficient catalytic reduction of nitrogen oxides ($NO_x$) in exhaust gases with nitrogen-bearing compounds, preferably ammonia or nitrogen-bearing starting compounds which during or shortly before the reaction with $NO_x$ are converted to ammonia, in that respect particularly preferably urea. In particular the use of the digestion residue instead of or in combination with titanium dioxide in the selective catalytic reduction (SCR) of nitrogen oxides by means of ammonia in accordance with:

$$4NO + 4NH_3 + O_2 \xrightarrow{catalyst} 4N_2 + 6H_2O.$$

is of interest in that respect. Sectors of use are in the static field for example power stations, coal-fired power stations, gas-fired power stations, refuse incineration installations, installations for nitric acid production or processing, steel works, and in the mobile field motor vehicles such as private cars and trucks as well as ships.

The invention provides in particular use of the dimensionally stable solid body according to the invention as a catalyst for reducing nitrogen oxides, in particular for selective catalytic reduction (SCR) and specifically also for fast SCR in which the following reactions take place:

$2NH_3+NO+NO_2>2N_2+3H_2O$(NO and $NO_2$ in the exhaust gas, fast), and $8NH_3+6NO_2>7N_2+12H_2O$(only $NO_2$ in the exhaust gas, slower).

The use of the catalyst according to the invention is particularly preferred in a motor vehicle, particularly preferably in combination with an oxidisation catalyst, preferably being connected downstream thereof.

The dimensionally stable solid body according to the invention can also be used for catalytic oxidation of $SO_2$.

In addition, areas of use are involved for the composition according to the invention and the products derived therefrom, in crude oil processing. Digestion residue or a mixture of digestion residue with additional titanium dioxide, for example a $TiO_2$ conventionally used as a support, can be used as a catalyst support for hydrodesulphurisation. Before being mixed with the catalytically active component (II) the digestion residue can be mixed with the additional titanium dioxide which is present predominantly in anatase form, therefore having an anatase-rutile ratio determined by X-ray diffractometry, of greater than 90:10, particularly preferably greater than 99:1, and also preferably having a BET surface area of 40 to 350 m²/g. The catalytically active component (II) is preferably selected from a molybdenum, iron, nickel or cobalt compound or a combination or joint compound. Preferably $CoMo/TiO_2$, $NiMo/TiO_2$ or $FeMo/TiO_2$ are used as catalytically active oxidic systems, for example with a composition of 5 to 15% by weight of Mo and 0.1 to 0.8% by weight of Fe in the specified system of $FeMo/TiO_2$.

In addition the digestion residue or the products according to the invention derived therefrom, by virtue of their finely divided nature and their high $TiO_2$ content, are very suited for use as an oxidation catalyst, preferably as a catalyst for the partial oxidation of hydrocarbons and for the oxidative synthesis of organic compounds, particularly preferably as a catalyst for the synthesis of organic acids, aldehydes and acid anhydrides such as for example phthalic acid anhydride or maleic acid anhydride. In the situation involving use as an oxidation catalyst, for example in selective oxidation, the man skilled in the art can easily control activity and selectivity in a given temperature range by targeted variation in the vanadium oxide content to be applied. The choice of the amounts to be applied is implemented by targeted quantitative variation in suitable test series such as for example as disclosed for a vanadium- and titanium-bearing system in G C Bond et al, Journal of Catalysis 57 (1979) 476-493.

In that respect, by a targeted variation in the vanadium oxide content to be applied, the man skilled in the art can not only easily control activity and selectivity in a given temperature range, but he can also optimise same by planned adjustment of the vanadium oxide content and promoter content in test series. For example in the synthesis of phthalic acid anhydride from ortho-xylol the vanadium oxide content and the promoter content (for example caesium, phosphorus or antimony compounds) is to be optimised in test series and the optimum range of the catalyst composition is in that case so selected that both incomplete under-oxidation which entails a yield loss and incomplete conversion of the ortho-xylol and also over-oxidation are avoided. By way of example a catalyst, on the basis of the digestion residue according to the invention, can involve the following composition: $V_2O_5$ 0 to 30, preferably 5 to 15% by weight, $Sb_2O_3$ 0 to 5, preferably 0.5 to 3% by weight, Cs 0 to 5, preferably 0.5 to 2% by weight, P 0 to 5, preferably 0.5 to 3% by weight, remaining proportions digestion residue and optionally further constituents.

By virtue of their finely divided nature, their high $TiO_2$ content and their variably adjustable sulphate content, the digestion residue or the products according to the invention derived therefrom are highly suited as a catalyst for isomerisation reactions, in particular for the formation of isobutane from butane, camphene from α-pinene. Hitherto in particular the use of binary metal oxides is disclosed for those reactions, such as for example $TiO_2$, $Fe_2O_3$ or $ZrO_2$ (Zeitschrift für Physikalische Chemie 130 (1982), 205-209).

In addition the digestion residue or the products according to the invention derived therefrom represent suitable catalysts and catalyst supports for a series of important processes such as for example epoxidation reactions (inexpensive and resource-saving production of propane oxide), aldol reactions (reaction of acetaldehyde to crotonaldehyde), oxidative dehydrogenation (ODH, reaction of propane with oxygen to give propene and water using a vanadium-bearing titanium concentrate or the products according to the invention), amidation reactions, heterogeneously catalysed Fischer-Tropsch reaction, coal liquefaction (CTL coal-to-liquids, GTC gas-to-coal, GTL gas-to-liquid), hydrogenation reactions or for example also methanol synthesis using a copper-bearing titanium concentrate or the products according to the invention.

In addition areas of application in exhaust gas post-treatment are afforded for the digestion residue and the products derived therefrom, from environmentally catalytic points of view. The digestion residue or the products according to the invention derived therefrom, by virtue of their composition according to the invention, their high $TiO_2$ content, their finely divided nature, and the small amount of soluble salts, are very well suited for soot oxidation in automobile applications, by providing a catalytically active, heat-resistant material for coating particulate filters. For that purpose preferably the support material, that is to say either the digestion residue alone or the mixture of digestion residue and additional $TiO_2$, is mixed with a tungsten compound and/or vanadium compound. A $V_2O_5$-bearing catalyst according to the invention is also suitable for the decomposition and removal of halogenated hydrocarbons such as for example chlorinated hydrocarbons, dioxins, furans, in particular polychlorinated dibenzodioxins or dibenzofurans, from exhaust gases, as occur for example in refuse incineration installations.

In addition the digestion residue or the products according to the invention derived therefrom, by virtue of their composition according to the invention, their high $TiO_2$ content, their finely divided nature, and the small amount of soluble salts, are also suitable for use in catalytic combustion operations, thus for example as efficient oxygen carriers, and thus makes an important contribution to improved, more environmentally friendly combustion operations in respect of fossil fuels (chemical-looping combustion).

In addition the digestion residue or the products according to the invention derived therefrom, by virtue of their variably adjustable sulphate content, are suitable in particular for catalytic applications which are based on the presence or the effect of acid centres on the surface, as sulphations on the surface of the digestion residue according to the invention produce acid centres or promote the formation of such acid surface functionalities. The digestion residue is therefore preferably suitable for acid catalysis, particularly preferably for isomerisation operations. R Ohnishi et al (Zeitschrift für Physikalische Chemie 130 (1982) 205-209) in contrast discloses only the action of $(NH_4)_2SO_4$ on $TiO_2$, $Fe_2O_3$.

The invention will be described in greater detail by means of the following Examples, in which respect the invention is in no way limited to those specific Examples.

Example 1

To assess catalytic activity, various samples TC, TC—V and TC—V—W with a digestion residue according to the invention (hereinafter referred to as titanium concentrate or TC), as well as comparative samples with various conventional titanium dioxides (Ti—V—W1, Ti—V—W2, Ti—V3, Ti—V4) as catalyst powder were considered. For that purpose the catalytic activity was determined in the decomposition of NO by an ammonia SCR reaction in a solid bed reactor. To provide the sample TC of a titanium concentration an insoluble digestion residue occurring in the production of titanium dioxide using the sulphate process in the sulphuric-acid digestion of titanium-bearing raw materials was neutralised with soda lye to a pH value of 7 to 8, then filtered and dried in the form of a filter cake in a laboratory drying cabinet at 120° C.

To produce the vanadium-bearing or tungsten-bearing samples (TC—V, TC—W and TC—V—W), they were impregnated with ammonium metavanadate (corresponding to a $V_2O_5$ content of 1.5% by weight with respect to the total weight of the sample) and ammonium paratungstate (corresponding to a $WO_3$-content of 10% by weight with respect to the total weight of the sample) in aqueous solution at room temperature, dried in the drying cabinet for a period of 14 h at 150° C. and then calcined for a period of 1 h at a temperature of 400° C. Prior to use in catalytic measurements the samples were converted by pressing, then comminution and sieving into a grain fraction with particle diameters of between 255 to 350 μm (sieve fraction).

To quantify the loading on the catalyst the space velocity (GHSV, gas hourly space velocity) was used. That is defined as the quotient of total volume flow of the educt gas and catalyst volume: $GHSV = V_{gas}/(m_{cat}/\rho_{cat})$. In this case a total volume flow of 183.4 ml/min was passed over 75 mg of the catalyst, resulting in a space velocity GHSV of 100,000 $h^{-1}$. In all cases the educt gas mixture contained 1000 ppm of NO, 1000 ppm of $NH_3$ and 2% of $O_2$ in helium. Analysis of the product gas mixture was effected by means of a combination of photometric measurement devices (BINOS) for the detection of NO, $NO_2$ and $NH_3$.

For the titanium concentrate according to the invention it was possible to surprisingly find the advantageous suitability in principle as a DeNOx catalyst, as shown in greater detail in Table 1 and in FIGS. 1 to 4. In spite of a significantly reduced titanium oxide proportion in the catalyst mass in comparison with a pure titanium oxide this did not lead to a proportional or over-proportional reduction in catalytic activity. The catalysts on a titanium concentrate base exhibited very good catalytic activity and action in various compositions and thus represent a competitive material.

TABLE 1

NO conversion (%)

| Temp °C. | TC | TC-V | TC-V-W | Ti-V-W1 | Ti-V-W2 | Ti-V3 | Ti-V4 |
|---|---|---|---|---|---|---|---|
| 150 | 18.7 | 0.14 | 1.5 | 2.3 | 2.7 | 2.4 | 0.5 |
| 200 | 20.2 | 1.79 | 4.1 | 9 | 7.1 | 4.4 | 0.7 |
| 250 | 20.7 | 14.4 | 12.1 | 30 | 36 | 13.9 | 3.1 |
| 300 | 24.7 | 47.3 | 49.1 | 53.8 | 54.4 | 29.2 | 9.1 |
| 350 | 40.7 | 73.6 | 93.3 | 83.1 | 78.5 | 53.3 | 26.5 |
| 400 | 40.3 | 80 | 99.2 | 93.2 | 88.7 | 79.6 | 56 |
| 450 | 66.9 | 50 | 90.7 | 94.6 | 87.8 | 89 | 66.6 |
| 500 | 62.1 | 1.75 | 60.0 | 88.3 | 76 | 86.9 | 64.1 |
| 550 | 43.7 | −27.7 | 17.3 | 72.4 | 51.6 | 70.5 | 54.6 |
| 600 | 25.4 | −48.4 | −21.3 | 42.6 | 26 | 31.7 | 27.1 |
| 650 | 6 | −54.1 | −39.9 | 6.5 | 4 | 5.9 | 1.7 |
| 700 | 6.2 | −56.9 | −47.9 | −20.3 | −10.9 | −26.2 | −17.4 |
| 750 | 9 | −56.9 | −61.7 | −41.4 | −15.4 | −44.5 | −22 |

TC = titanium concentrate (or digestion residue)
Ti = titanium dioxide
W = 10% by weight of $WO_3$ with respect to the total weight of the sample
V = 1.5% by weight of $V_2O_5$ with respect to the total weight of the sample
Ti-V-W1 = laboratory pattern: titanium dioxide component: anatase with a BET surface area of 350 m²/g
Ti-V-W2 = commercially obtainable material, crenox A-DW-1)
Ti-V 3 = titanium dioxide component: anatase with a BET surface area of 90 m²/g
Ti-V 4 = titanium dioxide component: anatase with a BET surface area of 350 m²/g.

FIG. 2 (and columns 1 to 4 of the above Table) specify catalytic activity as a function of temperature. It is shown that:
  pure digestion residue (TC) washed free of salt achieves a catalytic degree of efficiency of over 60% (in the temperature range of 450 to 500° C.). In addition it is striking that no unwanted NO formation occurs even at temperatures over 700° C.
  Pure digestion residue washed salt-free, with the addition of 1.5% by weight of $V_2O_5$ (TC—V) achieves a catalytic efficiency of over 70% (in the temperature range of 350 to 400° C.).
  Pure digestion residue washed salt-free, with the addition of 1.5% by weight of $V_2O_5$ and 10% by weight of $WO_3$ (TC—V—W) achieves a catalytic efficiency of over 90% (in the temperature range of 350 to 450° C.).

FIG. 3 (and columns 3, 7 and 8 of the above Table) specifies catalytic activity as a function of temperature for a digestion residue according to the invention with the addition of 1.5% by weight of $V_2O_5$ (TC—V, column 3), in comparison with two titanium dioxide variants with the addition of 1.5% by weight of $V_2O_5$ as reference (Ti—V3, column 7, and Ti—V-4, column 8). Ti—V-3 has a specific surface area of about 90 m²/g; Ti—V-4 has a specific surface area of about 350 m²/g.

It is shown that pure digestion residue washed free of salt, with the addition of 1.5% of $V_2O_5$, has an acceptable activity over the entire temperature range and in the low temperature range even reaches a better catalytic level of efficiency than the reference materials.

FIG. 4 (and columns 4 to 6 of the above Table) specifies the catalytic activity as a function of temperature for a digestion residue according to the invention. with the addition of 1.5% by weight of $V_2O_5$ and 10% by weight of $WO_3$ (TC—V—W, column 4), in comparison with two titanium dioxide variants with the addition of 1.5% by weight of $V_2O_5$ and 10% of $WO_3$ as a reference (Ti—V—W1, column 5 and Ti—V—W2, column 6). Ti—V—W1 (laboratory product) and Ti—V—W2 (product produced on a large technical scale) have a specific surface area of 350 and about 90 m³/g respectively.

It is shown that pure digestion residue which is washed free of salt, with the addition of 1.5% by weight of $V_2O_5$ and 10% by weight of $WO_3$, up to a temperature of about 500° C., reaches a very high level of efficiency comparable to the reference materials, and in part an even better level of efficiency.

Example 2

Catalytic activity for a digestion residue according to the invention, with the addition of 1.5% of $V_2O_5$ and 10% of $WO_3$ was investigated, wherein the digestion residue had been pre-treated in various ways prior to the addition of the V-compound and the W-compound.

Washed digestion residues were prepared after filtration (membrane filter press) in the following manner. Starting material in each case was the filter press discharge (MFP-discharge), with a solids content of 75.4% (IR-drier), pH of 1.6 (10% suspension). The digestion residues were then treated as described in variants A to F.

A Drying (Acid-Bearing):
 150 g of MFP-discharge was dried at 130° C. in the circulating air drying cabinet. Comminution was then effected in the mortar. Constituents<100 μm were sieved off.
 Yield: 119 g.

Neutralisation with Soda Lye+Drying (Salt-Bearing)
 150 g of MFP-discharge was mixed with about 500 ml of demineralised water on a magnetic stirrer (pH 1.3). The resulting suspension was then adjusted with 12.0 g of concentrated soda lye to a pH value of 7 and dried at 130° C. in the circulating air drying cabinet. Comminution in a mortar was then effected. Constituents<100 μm were sieved off.
 Yield: 123 g.

C Neutralisation with Soda Lye+Filtration+Drying (Low-Salt)
 150 g of MFP-discharge was mixed with about 500 ml of demineralised water on a magnetic stirrer (pH 1.3). The resulting suspension was then adjusted with 11.9 g of concentrated soda lye to a pH value of 7 and filtered over a double black band filter. The resulting filter cake was dried at 130° C. in the circulating air drying cabinet. Comminution in a mortar was then effected. Constituents<100 μm were sieved off.
 Yield: 112 g.

D Neutralisation with Soda Lye+Filtration+Washing+Drying (Salt-Free)
 150 g of MFP-discharge was mixed with about 500 ml of demineralised water on a magnetic stirrer (pH 1.3). The resulting suspension was then adjusted with 12.3 g of concentrated soda lye to a pH value of 7 and filtered over a double black band filter. Washing with 2 l of demineralised water was then effected. The resulting filter cake was dried at 130° C. in the circulating air drying cabinet. Comminution in a mortar was then effected. Constituents<100 μm were sieved off.
 Yield: 110 g.

E Neutralisation with Soda Lye+Spray Drying (Salt-Bearing)
 The MFP-discharge was adjusted with soda lye to a pH value of 8 and spray-dried.

F Neutralisation with Soda Lye+Filtration+Spray Drying (Salt-Free)

The MFP-discharge was adjusted with soda lye to a pH value of 8, filtered, again mixed with water and spray-dried.

The addition of vanadium and tungsten, production of the measurement samples and measurement of the NO conversion rates was effected in the same manner as described in Example 1.

FIG. 5 shows the catalytic activities (NO conversions) of the compositions according to the invention of Examples 2A to 2F with 1.5% by weight of $V_2O_5$ and 10% by weight of $WO_3$ in comparison with a conventionally supported $V_2O_5$—$WO_3$ catalyst on an anatase-$TiO_2$ support (Ti—V—W) in the temperature range of 150° C. to 750° C.

It is shown that washing out salts (in the form of sodium sulphate) is particularly advantageous for catalyst effectiveness.

The invention claimed is:

1. A composition, comprising:
    an insoluble digestion residue occurring in the production of titanium dioxide using the sulphate process upon digestion of a titanium-bearing starting material with sulphuric acid, and
    at least one further component which is catalytically active comprising one or more tungsten- or vanadium-compounds,
    wherein the composition comprises at least 1.0% by weight tungsten, calculated as $WO_3$, and/or at least 0.05% by weight vanadium, calculated as $V_2O_5$, with respect to the solids content of the composition.

2. A composition according to claim 1, wherein
    the digestion residue has been partially neutralised,
    optionally the impurities of the digestion residue have been partially washed out, and
    optionally the composition has been calcined.

3. A composition according to claim 1, wherein the sulphate content of the digestion residue is 1.0 to 6.0% by weight with respect to the solids content of the digestion residue.

4. A composition according to claim 1, wherein a pH value of the composition is from 1 to 5.

5. A composition according to claim 1, wherein the digestion residue is present in the form of a filter cake or a suspension with a solids content of less than 90% by weight.

6. A composition according to claim 1, having a Ti-content of 6 to 54% by weight.

7. A composition according to claim 2, wherein after calcination at 300° C. to 900° C. for 0.1 to 20 hours the composition has a BET surface area of 3 to 70 m²/g.

8. A composition according to claim 1, wherein it has a sulphate content of 0.1 to 10% by weight, with respect to the solids proportion of the composition.

9. A composition according to claim 1, wherein the intensity of the rutile main reflex determined by X-ray powder diffractometry at 2theta=27.5°, is at least 10% of the intensity of the most intensive of all other reflexes of an X-ray powder diagram.

10. A composition according to claim 1, wherein besides the titanium dioxide contained in the digestion residue the composition comprises additional titanium dioxide in anatase form, wherein the weight ratio of digestion residue to the additional titanium dioxide is greater than 50:50.

11. A composition according to claim 1, wherein the composition further comprises at least one further metal oxide selected from the group consisting of molybdenum, iron and manganese.

12. A process for the production of the composition according to claim 1, comprising:
    (a) digestion of a titanium-bearing starting material with sulphuric acid to obtain a solids-bearing digestion solution,
    (b) separating off the solids contained in the digestion solution to obtain a digestion residue and a substantially solids-free digestion solution,
    (c) optionally neutralising and/or partially washing out the impurities,
    (d) mixing the digestion residue with at least one further component which is catalytically active comprising one or more tungsten- or vanadium-compounds, and
    (e) optionally calcining the mixture obtained.

13. A catalyst or catalyst raw material containing a composition according to claim 1.

14. A method for obtaining a dimensionally stable, catalytically active solid body, comprising:
    mixing the composition according to claim 1 with binding agents, optionally plasticisers and further additives; and
    shaping the composition, and subsequent calcination.

15. A dimensionally stable, catalytically active solid body obtained according to the method of claim 14.

16. A method for obtaining a dimensionally stable, catalytically active solid body, comprising:
    applying the composition according to claim 1 optionally together with binding agents, plasticisers and/or further additives, to a support material, and
    subsequently calcining.

17. A dimensionally stable, catalytically active solid body obtained according to the method of claim 16.

18. A composition according to claim 2, wherein the impurities of the digestion residue comprise neutral salts.

19. A process according to claim 12, wherein the impurities of the digestion residue comprise neutral salts.

20. A method according to claim 14, wherein said shaping the composition is by extrusion.

* * * * *